(12) United States Patent
Deliwala (10) Patent No.: US 12,412,054 B2
(45) Date of Patent: Sep. 9, 2025

(54) LOW HEIGHT PROXIMITY-BASED OPTICAL CODE READER

(71) Applicant: Shrenik Deliwala, Andover, MA (US)

(72) Inventor: Shrenik Deliwala, Andover, MA (US)

( * ) Notice: Subject to any disclaimer, the term of this patent is extended or adjusted under 35 U.S.C. 154(b) by 76 days.

(21) Appl. No.: 18/257,498

(22) PCT Filed: Dec. 17, 2021

(86) PCT No.: PCT/US2021/072998
§ 371 (c)(1),
(2) Date: Jun. 14, 2023

(87) PCT Pub. No.: WO2022/133489
PCT Pub. Date: Jun. 23, 2022

(65) Prior Publication Data
US 2024/0037355 A1 Feb. 1, 2024

Related U.S. Application Data

(60) Provisional application No. 63/199,319, filed on Dec. 18, 2020.

(51) Int. Cl.
*G06K 7/10* (2006.01)
*G06K 7/015* (2006.01)

(52) U.S. Cl.
CPC ......... *G06K 7/10861* (2013.01); *G06K 7/015* (2013.01); *G06K 7/10742* (2013.01); *G06K 7/10831* (2013.01); *G06K 7/10792* (2013.01)

(58) Field of Classification Search
CPC ............... G06K 7/10861; G06K 7/015; G06K 7/10742; G06K 7/10831; G06K 7/10792; G06K 7/1413; G06K 7/10732

(Continued)

(56) References Cited

U.S. PATENT DOCUMENTS 5,268,562 A 12/1993 Lazaridis
5,780,304 A 7/1998 Matzinger et al.
(Continued)

FOREIGN PATENT DOCUMENTS

WO WO-2022133489 A1 6/2022

OTHER PUBLICATIONS

"International Application Serial No. PCT/US2021/072998, International Search Report mailed Apr. 8, 2022", 5 pgs.
(Continued)

*Primary Examiner* — Matthew Mikels
(74) *Attorney, Agent, or Firm* — Schwegman Lundberg & Woessner, P.A.

(57) ABSTRACT

A system for optically reading an encoded pattern on a patterned test strip or other patterned target placed in proximity and moved with respect to an optical code reader. The reader can include an LED light source. A transmit baffle located between the LED light source and the target can define a transmit aperture for passing light originating from the LED light source to a target location on the patterned target. A photodetector arranged to receive light associated with the target location can produce a response signal providing information about the encoded pattern at the target location. A receive baffle located between the photodetector and the target can define a receive aperture for passing light from the target to the photodetector. Signal processing circuitry can be coupled to the photodetector to receive the response signal, and to decode information about the encoded pattern.

32 Claims, 10 Drawing Sheets

(58) Field of Classification Search
USPC .......................................................... 235/454
See application file for complete search history.

(56) References Cited

U.S. PATENT DOCUMENTS

| | | |
|---|---|---|
| 2002/0043562 A1 | 4/2002 | Zazzu et al. |
| 2005/0087681 A1* | 4/2005 | Chin .................. G01D 5/34715 |
| | | 250/231.13 |
| 2006/0082557 A1 | 4/2006 | Ericson et al. |
| 2008/0121789 A1* | 5/2008 | Augstein .............. G06V 10/145 |
| | | 250/237 R |
| 2017/0261425 A1 | 9/2017 | Deliwala |

OTHER PUBLICATIONS

"International Application Serial No. PCT/US2021/072998, Invitation to Pay Additional Fees mailed Feb. 4, 2022", 2 pgs.
"International Application Serial No. PCT/US2021/072998, Written Opinion mailed 04-08-2022", 10 pgs.
International Application Serial No. PCT/US2021/072998, International Preliminary Report on Patentability mailed Jun. 29, 2023, 12 pgs.

* cited by examiner

LOW HEIGHT PROXIMITY-BASED OPTICAL CODE READER

CLAIM OF PRIORITY

This patent application is a U.S. National Stage Filing under 35 U.S.C. 371 from International Application No. PCT/US2021/072998, filed Dec. 17, 2021, and published as WO 2022/133489, which claims the benefit of priority of Deliwala U.S. Provisional Patent Application Ser. No. 63/199,319 entitled LOW HEIGHT PROXIMITY-BASED OPTICAL CODE READER, which was filed on Dec. 18, 2020, each of which are hereby incorporated by reference herein in their entirety, and the benefit of priority of each of which is claimed.

TECHNICAL FIELD

This document pertains generally, but not by way of limitation, to optical code readers.

BACKGROUND

A printed binary code is a straightforward and inexpensive method to transmit information. Examples of these codes have become ubiquitous and can be found everywhere, such as QR codes, UPC codes, etc. For example, in certain medical devices, such as a glucose reader or an assay that performs a lateral flow test, or various electro-chemical assays, there is a need for a straightforward way to transmit calibration and other manufacturing information. This type of embedded information can be useful with glucose strips or other clinical tests. For example, the code on the test strip can alert the reader that the test strip has expired. Optical, capacitive, conductive, or ROM based codes can be embedded in the strip. Optical bar codes are straightforward to implement. Most optical read-out technologies, however, use scanning lasers, or a fixed illumination coupled with an imaging system. Such technologies can be expensive and generally require large volume of space to accommodate lenses and imaging systems.

SUMMARY

The present inventor has recognized, among other things, that the need for improved routine, low-cost testing has become even more urgent. The recent Covid-19 pandemic increases the need for remote health monitoring, which will continue to become an important part of health care delivery. The biochemistry to measure specific agents in the blood can be very sophisticated, and for each of these complex chemistries to be made available and useful, it has become even more important that a low-cost, flexible, and compact code reader be found. Such a code reader can then be placed in or with the electrochemical or colorimetric sensors, and such a code reader can be useful for, among other things, reading printed or encoded data, such as can include manufacturing date, batch number, or other information deemed useful for accurate read-out.

This document describes, among other things, a low-cost, low-height, non-imaging, high resolution optical reader, such as can provide high data bit density. The present optical reader can be used anywhere printed or encoded information is to be read, and where the present optical reader can be placed close to the printed or otherwise encoded information for read-out. Certain other approaches using a scanner or an imaging system utilize lenses to focus light either on the transmit side or the receive side or both. While such lensed systems can work well, they are difficult to adapt for use in compact spaces. An illustrative, non-limiting example of such a potential use can be in reading printed codes on glucose test strips or similar clinical diagnostic strips, such as where these codes can be printed or otherwise formed on the strip.

The present approach can help enable reading binary as well as multi-level printed information. Scanning of the printed information can be accomplished by the movement of the strip relative to the reader assembly, or vice-versa. This movement may be provided or guided during the short time during which the strip is inserted in the reader, and can be provided either manually, or assisted by a mechanical system that provides or guides relative motion between the strip or other target to be read and the reader assembly.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

1. Example of Transmissively Optically Reading a Pattern

Figure 1:
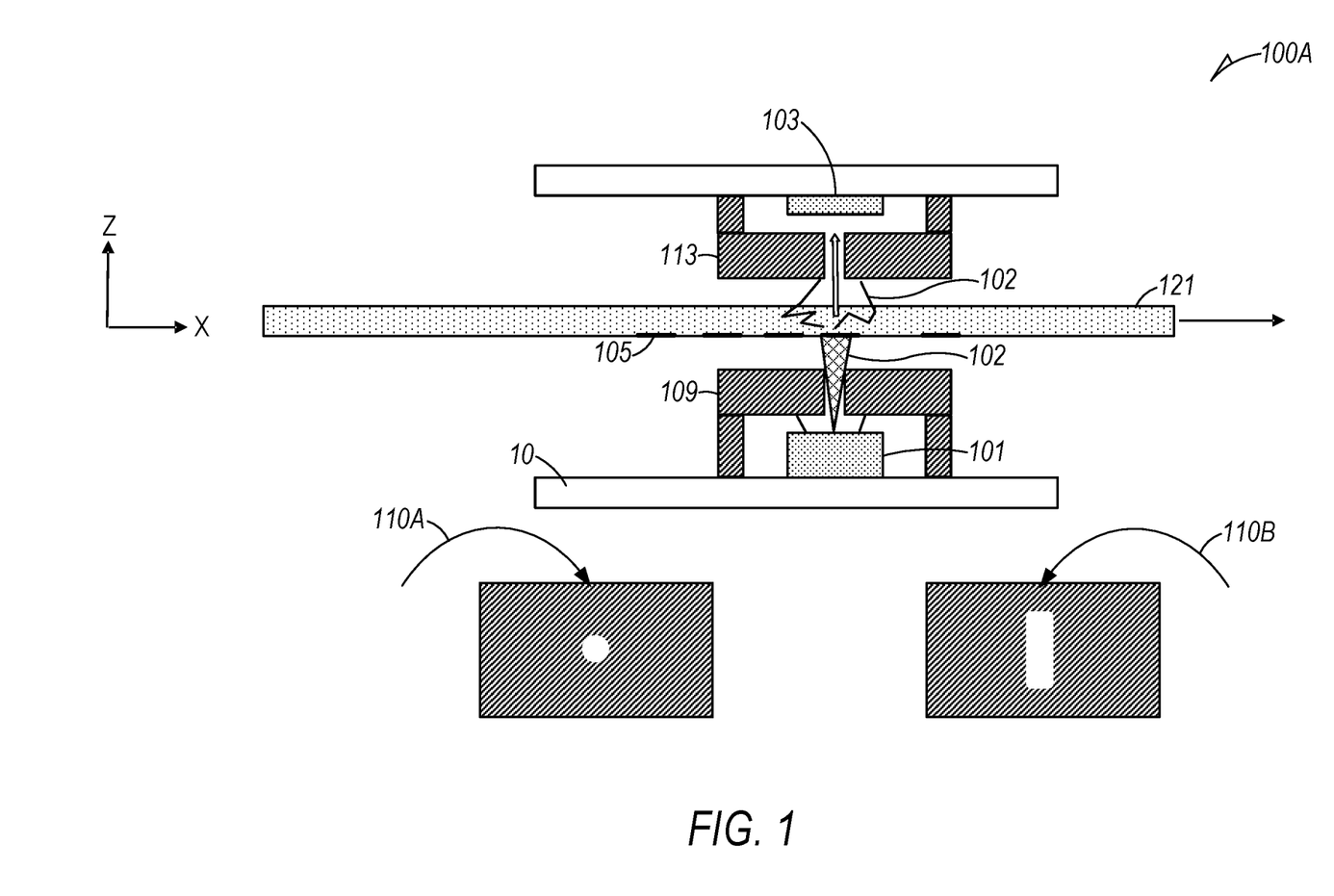
FIG. 1: shows an illustrative example of a strip code reader being used in transmission such as for optically reading printed, patterned, or other information located on a strip or other target.

FIG. 1 shows an illustrative example of a strip code reader system 100A being used in transmission, such as for optically reading printed, patterned, or other information located on target or workpiece, such as a moving or movable strip 121. The strip 121 can include other functionality, such as chemical sensing functionality, such as in the illustrative example of a glucose or other chemical assay, or mechanical or electrical functionality.

In the example of FIG. 1, the strip code reader system 100A can include a light source 101, such as an LED light source, such as with a broad angle light output that can be constrained, such as by a pinhole or other aperture in a baffle 109 that can be otherwise opaque to transmission of light by the light source 101. For example, the baffle 109 can include a lid that can be mounted to a printed circuit board or other carrier or substrate 10 upon which the LED or other light source 101 can be mounted. Thus, via the aperture, a narrow angle beam cone of projected light 102 may be directed on the strip 121 or other target carrying a printed or other like pattern 105. The strip 121 or other target may be manually or mechanically moved with respect to one or more other components of the optical strip reader 100A, such as shown in FIG. 1.

In the example of FIG. 1, the baffle 109 can form a thick or a deep pinhole to or other aperture or opening, such as to restrict the projected cone of light 102, such as in a manner that can project light constrained by the shape of the opening. The thickness of the baffle 109 can be selected such as to project a light spot of an area or size that is close to the area or size of the pattern to be read, e.g., taking into account the distance between a top surface of the baffle 109 and the facing surface of the strip 121. A top view of the baffle 109 is shown at 110A where, in an example, the baffle 109 can define a round opening. Another top view of the baffle 109 is shown at 110B, where the baffle 109 can define a cylindrical, oblong, slot or slit-like opening 110B, such as having one lateral dimension that is longer than an orthogonal lateral dimension. The slit-like opening 110B may be advantageous, such as to code multilevel information (see, e.g., FIG. 3). The slit-like opening 110B may also help make the read-out more robust, such as to help accommodate lateral misalignment of the pattern on the strip 121 to the projected light 102.

A geometry of the aperture 110 determines the size of the resulting light spot on the strip 121 from the projected light cone 102. The cone angle of light 102 leaving the top of the baffle 109 will depend on the thickness of the baffle 109, the size of one or more dimensions of the opening 110, the size of the LED or other light source 101, and the distance from the LED or other light source 101 to the bottom (e.g., interior lid) surface of the baffle 109. This light spot size can be calculated, such as using optical ray tracing. In an example, a thickness of the baffle in a region about the opening 110 can be selected based on a desired cone angle of light 102, such as for example a preferred cone angle of emerging light <30 degrees or a preferred aspect ratio of the opening 110>3. The cone angle θ can be described by the relationship $\tan(\theta)=2\,h/s$, in which "s" is the shortest lateral segment of the opening and "h" is the height from the initially-encountered light-directing surface to the top of the baffle.

An aspect ratio of the opening 110 controls the outgoing ray angles. For example, a 100 μm opening in a thick baffle 109 having a top surface (facing the strip 121) that is almost a millimeter away from the LED light source 101 will project onto the strip 121 only a slightly bigger light spot as compared to if the light source 101 were located another 300-500 μm away from the top surface (facing the strip 121) of the baffle 109. Thus, a shaped light spot can be projected onto the facing surface of the strip 121 without requiring the use of a lens or similar focusing element. Much of the LED light from the LED light source 101 may be lost inside the cavity formed by the baffle 109 and the substrate 10, however, the cavity can be coated with a reflecting material, or otherwise made reflective, such as to help improve an efficiency of light being outcoupled via the opening 110. As explained with respect to FIG. 4, this approach can help allow for the possibility of less precise alignment of LED light source 101 to the baffle opening 110, or can help allow using one LED light source 101 to illuminate multiple lanes on the strip 121. Multiple LED light sources 101 can be contained within the cavity formed by the baffle 109 and substrate 10, if desired, and such multiple LEDs can include similar or different output characteristics, as desired.

If the surface of the strip 121 is printed or otherwise patterned on the side of the strip 121 facing the LED light source 121, then an intensity of the light received through the strip 121 (e.g., in a transmissive optical reading configuration such as shown in FIG. 1) by a photodetector or other light receiver 103 will vary as the pattern passes by the projected spot, such as by movement of the strip 121. If the strip 121 includes or is made from a highly light-scattering material, then the contrast of the pattern can be further improved by having receive-side arrangement, such as can include a baffle or scatter block 113, such as to help restrict the amount of scattered light received by the light receiver 103, and to help predominantly receive more direct light rays, such as shown in the example of FIG. 1. In some cases, when the printed surface of the strip 121 is not too scattering or the printed pattern facing the LED light source 101 side has sufficient contrast, then the restrictive baffle 113 defining a receive-side aperture may not be necessary and can be omitted. Note that the shape of the restrictive aperture in the receive-side baffle 113 may be suitably chosen based on the shape of the transmitting-side aperture 110A or 110B in the baffle 109, and need not be the same dimension(s) on the receive side as the corresponding dimension(s) on the transmit-side.

2. Example of Reflectively Optically Reading a Pattern

Figure 2A:
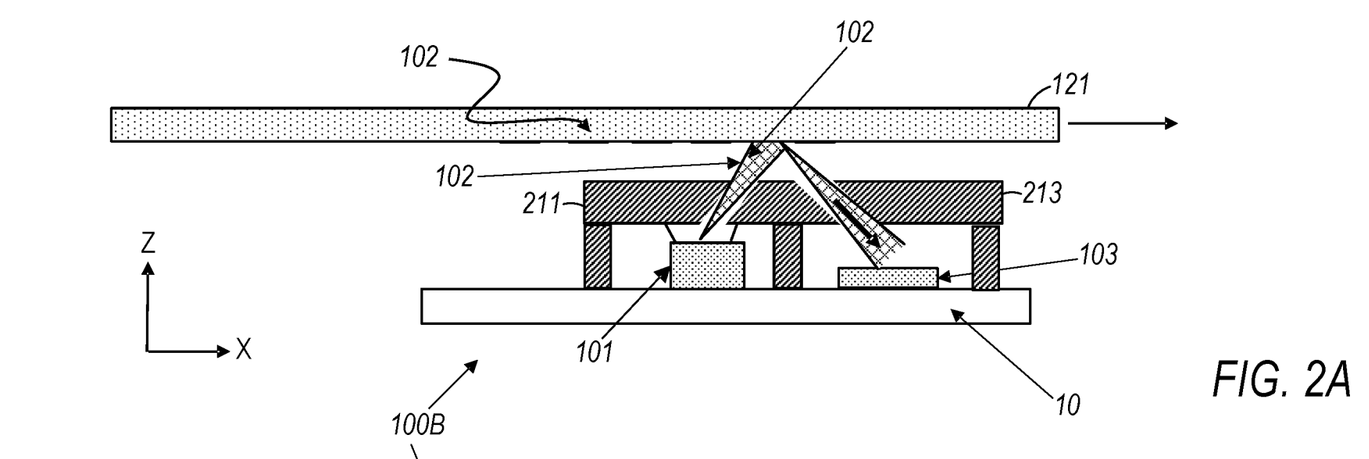
FIGS. 2A, 2B, 2C: show an illustrative example of a strip code reader in being used in reflection such as for optically reading printed, patterned, or other information located on a strip or other target.
Figure 2B:
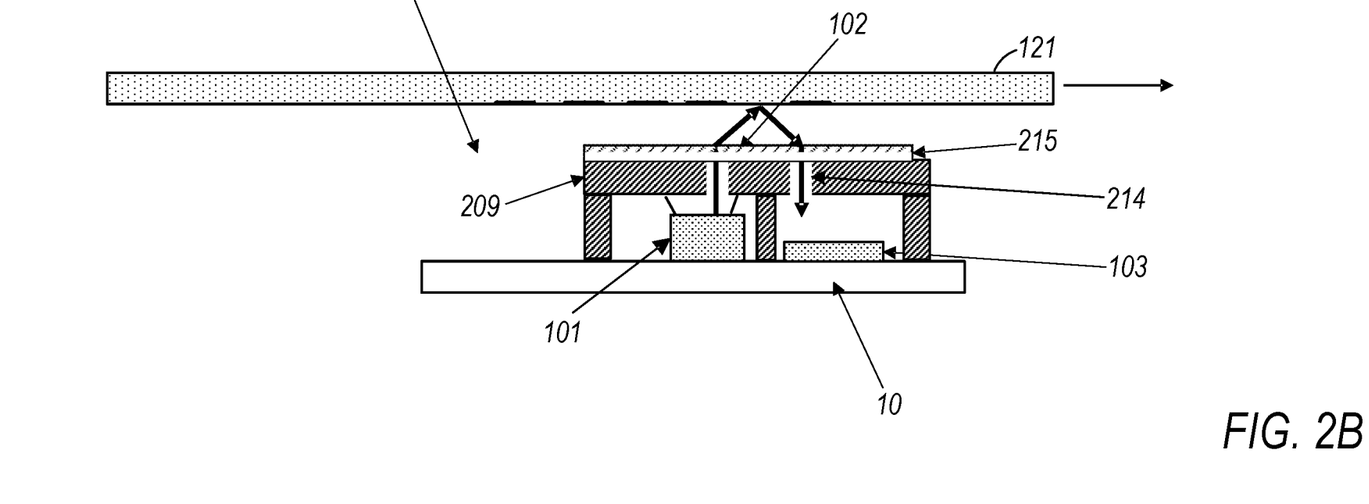
Figure 2C:
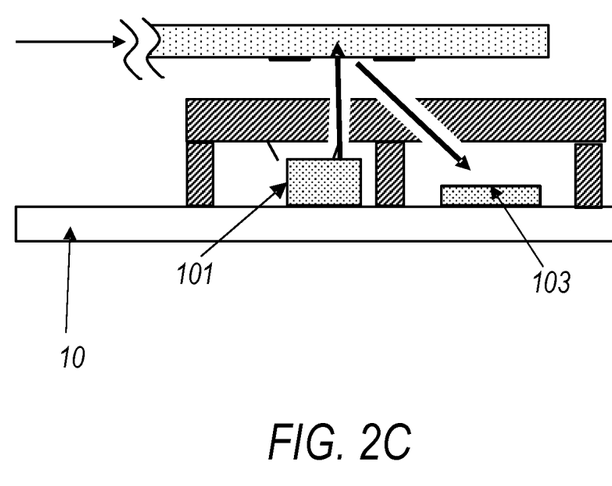

FIGS. 2A, 2B, and 2C show an illustrative example of a strip code reader system 100B being used in reflection, such as for optically reading printed, patterned, or other information located on a strip 121 or other target or workpiece. In the reflection arrangement of FIGS. 2A, 2B, 2C the emitted light reflects from the strip 121 back toward the photodetector or other light receiver, which is located on the same side of the strip 121 as the LED or other light source 101. For example, in the reflection arrangement, the light source 101 and the light receiver or detector 103 can be placed on the same substrate 10, such as in respective cavities formed by respective baffles, such as shown in FIGS. 2A, 2B.

The approach of reflection geometry can involve tilting the light rays from the LED or other light source 102, such that the reflected light can be directed towards the direction of the detector 103, such as in a manner that can allow efficient reflected light collection by the detector 103. At least two ways are shown in the figures. In the example of FIG. 2A, the respective apertures in the shared baffle (or individual baffles) can be obliquely angled, such as with respect to a perpendicular direction normal to the substrate 10, such as on each of the transmit side, such as shown at 211, and on the receive side, such as shown at 213. The opening lateral shape defined by this baffle on either the transmit side or the receive side can be circular, such as shown in 110A, or slit-like, such as shown in 110B. If the strip 121 or the other target media are highly light-scattering, then the transmit side deep hole 211 may be kept vertical in orientation (e.g., normal to the substrate 10) while leaving the receive side deep hole 213 as obliquely angled (e.g., with respect to a normal to the substrate 10) to receive scattered light, such as shown in FIG. 2C. FIG. 2B also shows an example of including a flat, thin, grating or other diffractive optic 215, such as to help bend the light emitted from the LED or other light source 1010 towards a desired location on the strip 121, such as from which the scattered reflected light can again redirected by the diffractive optic 215 to the light detector 103. In this example, one or both of the transmit opening 209 or the receive opening 214 in the baffle can be oriented vertical (e.g., normal to the substrate 10). This may be easier to manufacture than obliquely angled openings. A low-cost diffractive optic 215 can work well, because the LED light source 101 can have narrow wavelength distribution. Thus, the direction of diffracted light can be well-defined. The diffractive optic can also be cheaper and can provide a lower-profile than a lens-based refractive approach. The reflective geometry arrangement may be preferred, because in such an arrangement the transmit and receive components are located on the same side of the strip 121. This can help make all the electronic connections and relative component and path alignments easier.

3. Example of Extending the Present Approach to Multiple Parallel Lanes

Figure 3A:
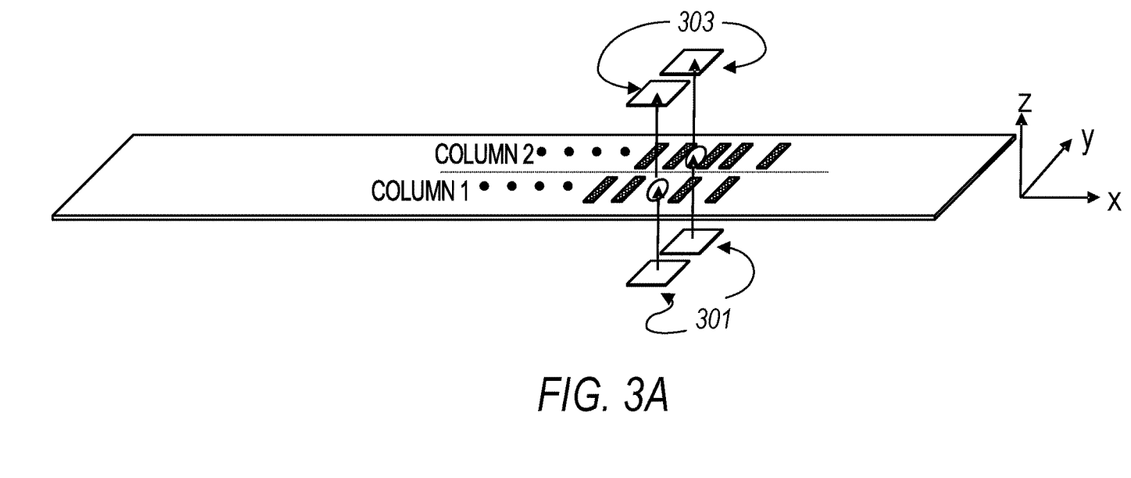
FIGS. 3A, 3B: show an illustrative example of a strip code reader showing multi-lane readout as well as multi-level, multi-lane read-out such as for optically reading printed, patterned, or other information located on a strip or other target.
Figure 3B:
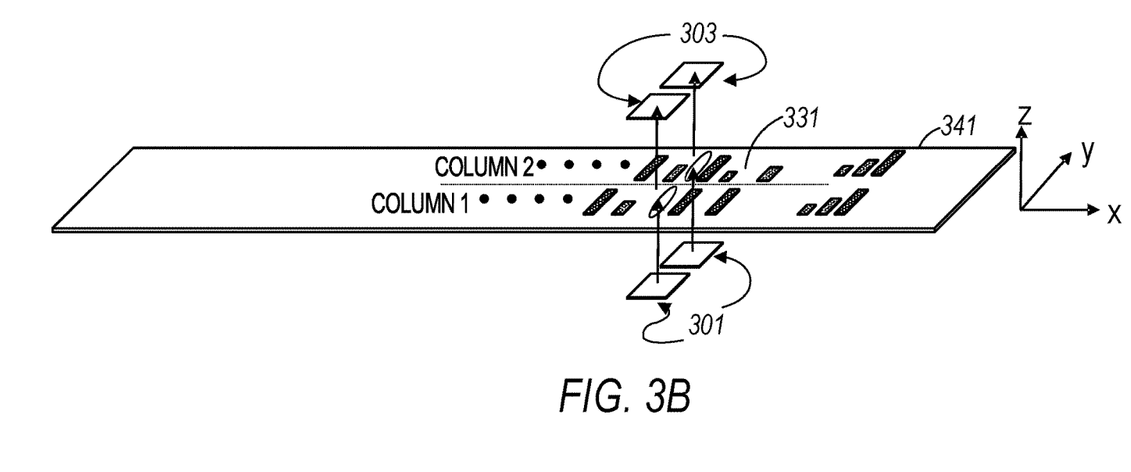

FIGS. 3A, 3B show an illustrative example of a strip code reader showing multi-lane readout as well as multi-level, multi-lane read-out such as for optically reading printed, patterned, or other information located on a strip or other target. In the examples of FIGS. 3A, 3B, the approach is extended in two ways, such as to help increase the total number of bits that can be printed or patterned onto the strip 121 and read by the optical strip reader 100. For example, one can use multiple lanes or columns corresponding to respective sub-portions along a width of the strip 121 in the y-direction, with the optical strip reader 100 including a corresponding arrangement of light sources 101, 301 respectively projecting corresponding light spots toward individual ones of the columns, and the corresponding receivers 103, 303 arranged to (transmissively, as shown, or reflectively) read corresponding ones of multiple lanes of data as the strip 121 moves in the x-direction. In the example of FIG. 3A, only two lanes or columns are shown for clarity, but the approach can be extended to further additional lanes parallel thereto, such as together extending across all or a substantial portion of the width in the y-direction of the strip 121. The light source 101 is shown in FIG. 3A as an array of light sources 301, with corresponding light emission holes in the baffle 109. The light detectors 103 are shown as an array of corresponding light detectors 303. While FIGS. 3A, 3B illustrate extension of the transmissive optical reader arrangement of FIG. 1, the underlying multiple lane approach can also be applied to a reflective optical reader arrangement, such as shown in the example of FIGS. 2A, 2B, 2C.

4. Example of Extending the Approach to to Multiple Bits Per Symbol

The number of bits that can be encoded by making a "gray-scale" read-out or multi-level encoding. In the example of FIG. 3B, the printed bars in each column can have different heights or lengths along the y-direction, and the projected light spot may be oblong instead of circular, such as using the slit-like opening 110B of FIG. 1. The different heights or lengths of the printed or patterned bars can provide multiple levels for encoding information, thus each bar can be coded for more than 1 bit of information. The optical reader system 100 may be calibrated, such as to identify different gray levels, such as by having a predetermined "initialization" pattern 341 that can be located on the strip 121 at the beginning (or end) of the scan as the strip 121 is moved past the reader arrangement of light emitters and light receivers. A similar calibration or initialization technique can be applied to the reflection geometry as well as to the transmissive optical reading arrangement shown in FIG. 3B.

Since we are using straightforward deep openings in the baffle, one need not confine the read-out to a single opening or illumination per lane. For example, one can envision a dual opening that produces a dual light spot. In such an example, the printed pattern on the strip 121 can jointly scatter light into the detector 103, 303. If there are two dark patterns on the strip 121 located in front of two light spots, then we may call the code 00, if there is only one of the dark patterns aligned, then we may assign code 01 or 10 depending on which one is aligned, and if two light patterns align, we can assign code 11. Thus, many possible approaches to gray-scale coding are possible using the present approach of projection and thick holes in the baffle. These approaches can still provide a low profile, can keep manufacturing complexity and cost low, and can provide increased the areal bit density.

5. Example of Low-Cost Method to Manufacture Multi-Lane Illuminator

Figure 4A:
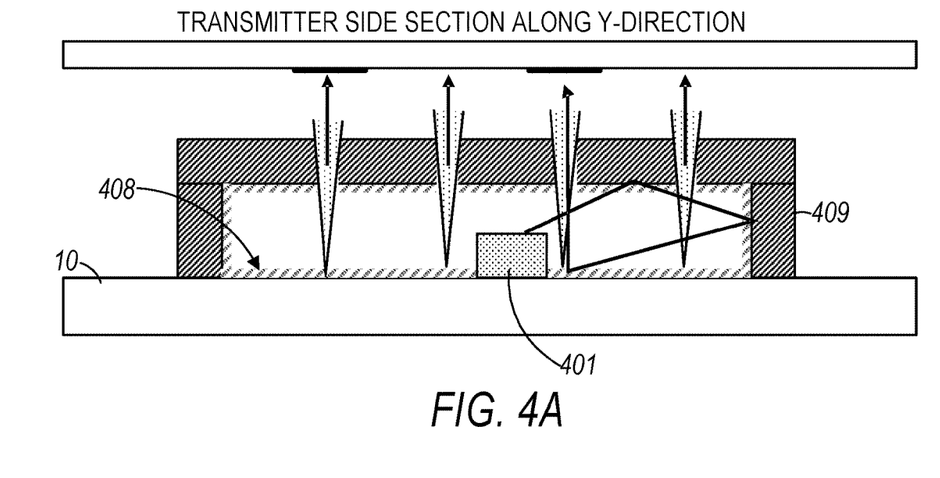
FIGS. 4A, 4B: show an illustrative example of an approach to make an efficient multi-lane light source, such as using one LED.
Figure 4B:
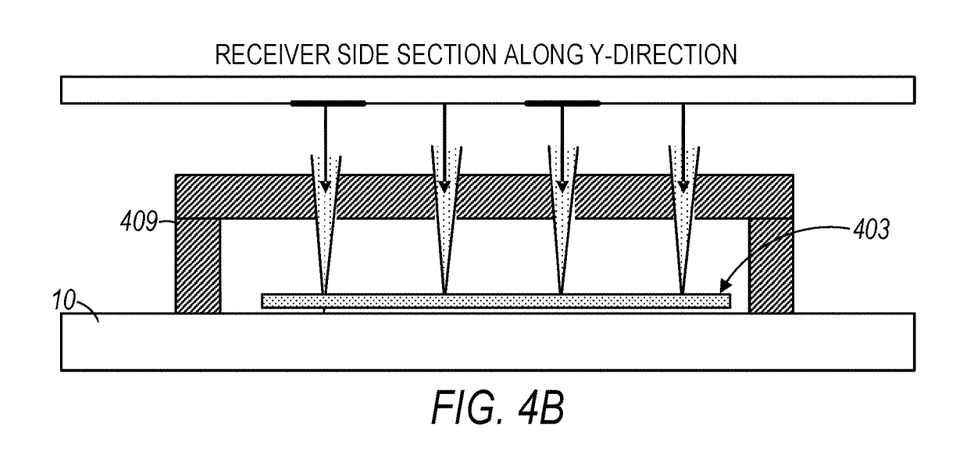

FIGS. 4A, 4B: show an illustrative example of a method to make an efficient multi-lane light source, such as using one LED. Thus, the approach shown in FIGS. 4A, 4B can provide a way to reduce cost and to implement a multi-lane read-out system, such as shown in FIGS. 3A, 3B. As explained, one can provide one transmitter and one receiver for each lane or column to extend the approach of FIGS. 1 and 2A, 2B, 2C to multiple lanes. When silicon photodiodes are selected for use as the photodetector 103, 303, a single silicon substrate with an array or other arrangement of multiple (e.g., photolithographically defined) photodiodes 403, such as shown in FIG. 4B, can help simplify assembly and relative alignment of the individual baffle holes to the corresponding photodiodes 403.

FIG. 4B shows an illustrative example depicting 4 lanes of light receiver openings, but this approach can be adjusted for different number of lanes. On the other hand, since the cost of LED substrate may be high, instead of placing individual LED light sources 101 corresponding to respective lanes, it may be preferable to provide a shared LED light source 401 in a baffle cavity that defines 4 light-emitter openings in the baffle corresponding to the 4 desired lanes. This can help avoid a need for precisely placing LED light sources 101 next to each other to align to the light-emitting baffle holes. Another approach can be to include a larger LED die with multiple light-emission zones, such as was described with respect to the light detector. In both cases, the cost will be relatively high compared to a single LED solution shown in FIG. 4A. FIG. 4A shows an example of a more cost-effective approach, such as can place an LED or other light source within a cavity, such as formed by the baffle 409 and the substrate 10. A surface-roughened mirror or other reflective surface can be coated or otherwise provided on the interior walls of the cavity. This mirror can help direct from the LED light source 401 toward and out of the individual light-emitting apertures toward respective lanes on the strip 121. For example, such a modified baffle 409 can be internally coated with reflective surface—such as a metallic coating—with rough sidewalls. This highly reflective baffle causes the light emitted from the LED light source 401, which is emitted in all directions, to bounce around inside the cavity and to exit through the open apertures. In this manner, a single LED 401 can be configured to provide light through respective apertures for each of 4 (or other number) of lanes as shown without requiring precision alignment of the LED light source 401 to 4 holes in the baffle. This approach can be generalized to a desired number of holes, depending on the need or application. One can also use more than one LED light source 401 inside the cavity, and such light sources can have similar or different operating characteristics (e.g., wavelength, intensity, power consumption), as desired depending upon the need or application.

Figure 5:
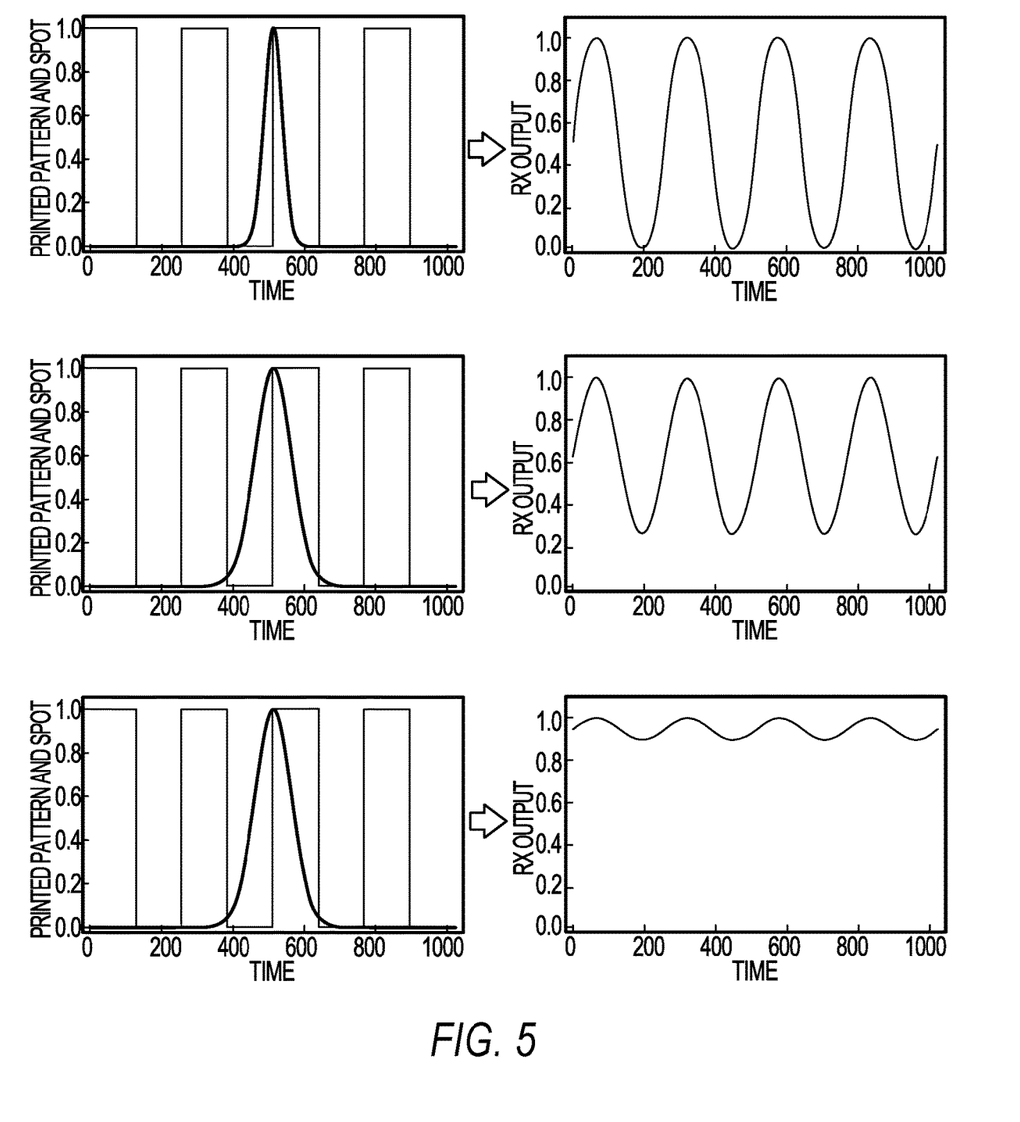
FIG. 5: shows an illustrative example of a computer-based model of impact of the relative size of the projected light spot to the size of the printed pattern.

6. Example of a Relationship of the Projected Light Spot to the Size of the Printed Pattern It can be noted that the size of the light spot can be considerably wider than the feature size of the printed pattern. For the example of alternately dark (e.g., black) and light (e.g., white) bands, FIG. 5 shows a mathematically modeled example of how the received light intensity would vary for different widths of the light spot. As seen in FIG. 5, increasing light spot width relative to the black and white pattern reduces the contrast between such zones, but the ability to decode a printed bit pattern can be performed with relatively high fidelity until a low signal-to-noise ratio begins to cause errors correctly assigning black and white or 0 and 1. From the standard bit error rate theory, a SNR or signal-to-noise ratio of 7 or 16.9 dB provides a bit error rate of roughly $10^{-12}$. Furthermore, one can use any of a number of error correcting codes in the printed pattern, such as to help improve on the SNR requirement.

A line width of the black and white pattern determines the linear bit density. For example, it is possible to make the pattern width as small as 25 μm or a print resolution of 1000 dots per inch (DPI) and thus quite easily providing density of 40 bits/mm. Printers with higher resolution are readily available. By using multiple lanes, such as can be separated to function robustly with the tolerances of the alignment of the strip 121 to the reader 100 (e.g., using a mechanical guide), and permitting use of multi-level gray-scale coding, a much higher spatial encoded information density can be achieved. For example, without loss of generality, if there is one lane every 2 mm, and each code provides 4 levels of coding, then one can achieve a coding density of almost 640 bits/cm² or 80 Bytes/cm².

7. Example of Method of Making Angled Thick Holes

Figure 6A:
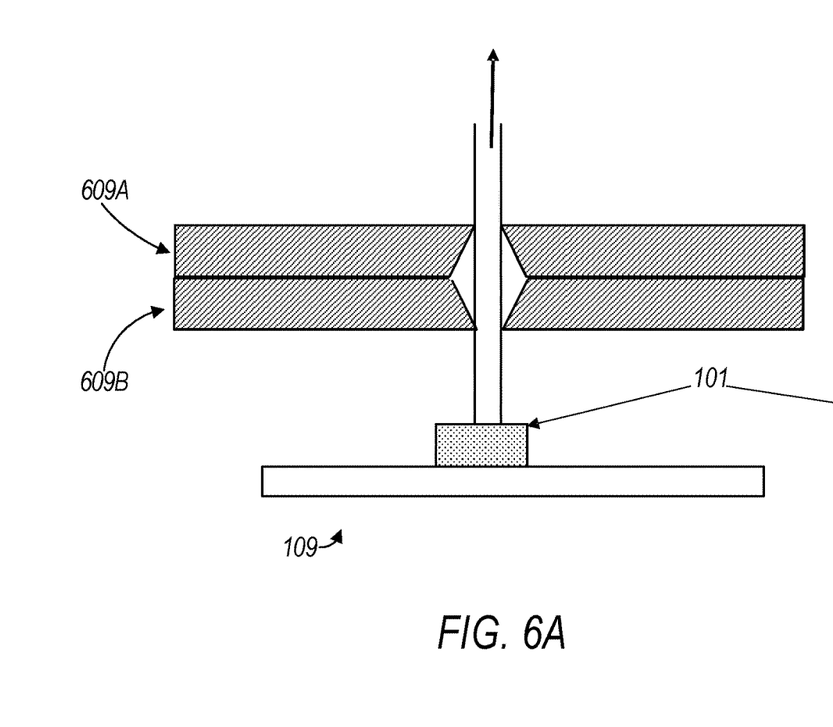
FIGS. 6A, 6B: show an illustrative example of an approach of making an angled light projection system, such as using multiple plastic or other pieces.
Figure 6B:
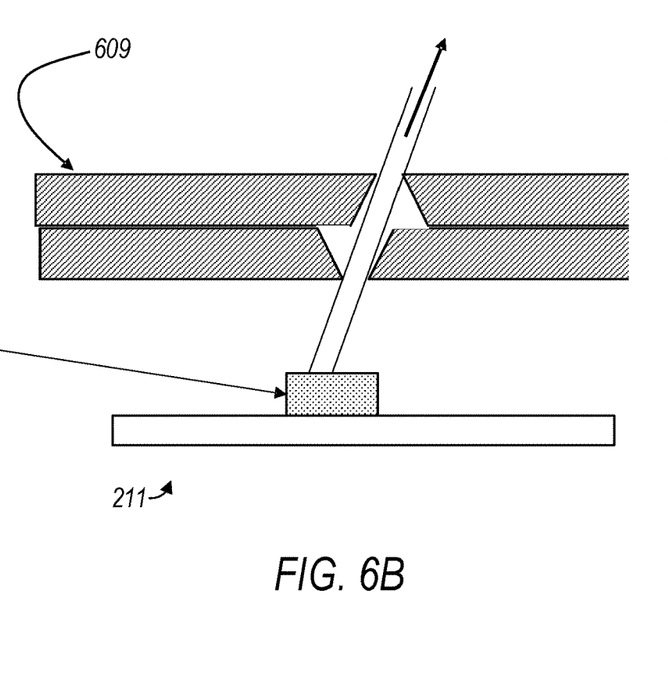

FIGS. 2A and 2C showed examples of a baffle providing obliquely angled openings, such as through which light can be transmitted or received. It may be difficult to adapt high-volume plastic molding techniques to form a baffle providing such obliquely angled holes. FIGS. 6A, 6B show an illustrative example of a multi-part baffle, such as a two-part baffle 609 made from separate components 609A and 609B, such as with a cross-sectionally trapezoidal opening in each piece. Both of the components 609A and 609B can be made from the same mold. The effective tilt or the angle of light that can be projected can be determined by how the two pieces are aligned and cemented or otherwise joined together during assembly. If the trapezoidal openings are directly aligned, such as with the bigger side of the trapezoidal openings facing toward each other than, such as shown in FIG. 6A, light can pass through the aligned trapezoidal openings and can emerge vertically (e.g., normal to a plane between the components 609A, 609B. In FIG. 6B, the same two components 609A, 609B can be cemented or otherwise joined with a jog or offset between otherwise vertically aligned trapezoidal openings, such that only the obliquely angled rays from the LED light source can pass through these intentionally slightly misaligned trapezoidal openings.

8. Examples of Other Potential Benefits and Other Patterns

In many cases, the strip 121 can be inserted into and movably guided with respect to optical reader system 100 manually by a user, e.g., by hand. Thus, a velocity or other characteristic of movement of the strip 121 may be irregular. The decoding ability can be improved if the reader 100 can determine the speed of insertion of the strip 121. In one approach, this can include providing a "timebase" on the strip 121, as well as spatial synchronization, such as to improve the ability of the reader 100 to decode. This can be implemented, for example, dedicating one column or lane to a fixed pattern of bright and dark transitions. The pattern itself can provide a "ruler" to provide a "clock" for determining the speed at which the strip 121 is being moved relative to the reader 100, and this information can be used by the reader 100 to help provide precise recovery of the other encoded information, such as can be included in other lanes or columns, such as described herein.

The pattern itself may include encoding to permit use of one of various error correction techniques or other methods to improve the readability, provide self-calibration, as well as start/stop codes.

LEDs can be preferable over vertical lasers such as a VCSEL laser for various reasons including cost, speckle noise, and difficulty in shaping a narrow beam in different shapes, such as for multi-level pattern features or alignment with a robust light pattern. This makes lasers less suitable for scattering media, which generate lots of speckle noise, etc., but may work better with highly transparent media.

9. Examples of Applications and Integration with Other Devices

Figure 7A:
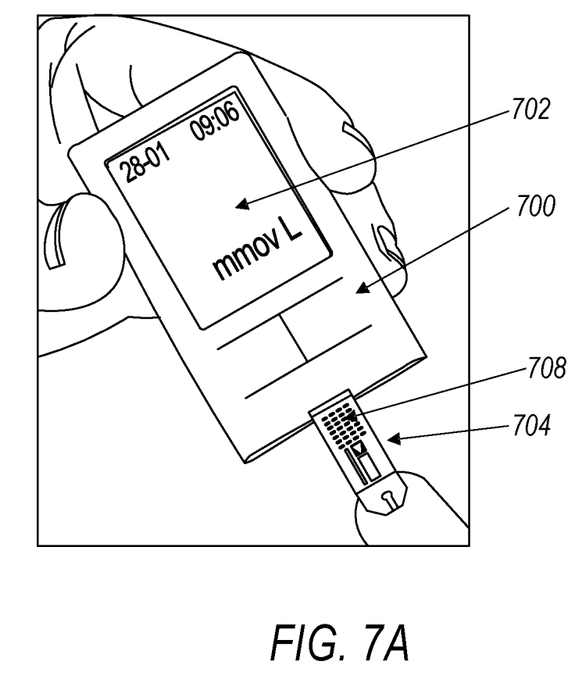
FIGS. 7A, 7B, and 7C: show an illustrative example of using the code reader integrated within a user interface or other electronics unit for reading the code along with a chemical assay co-located on the strip together with the code.
Figure 7B:
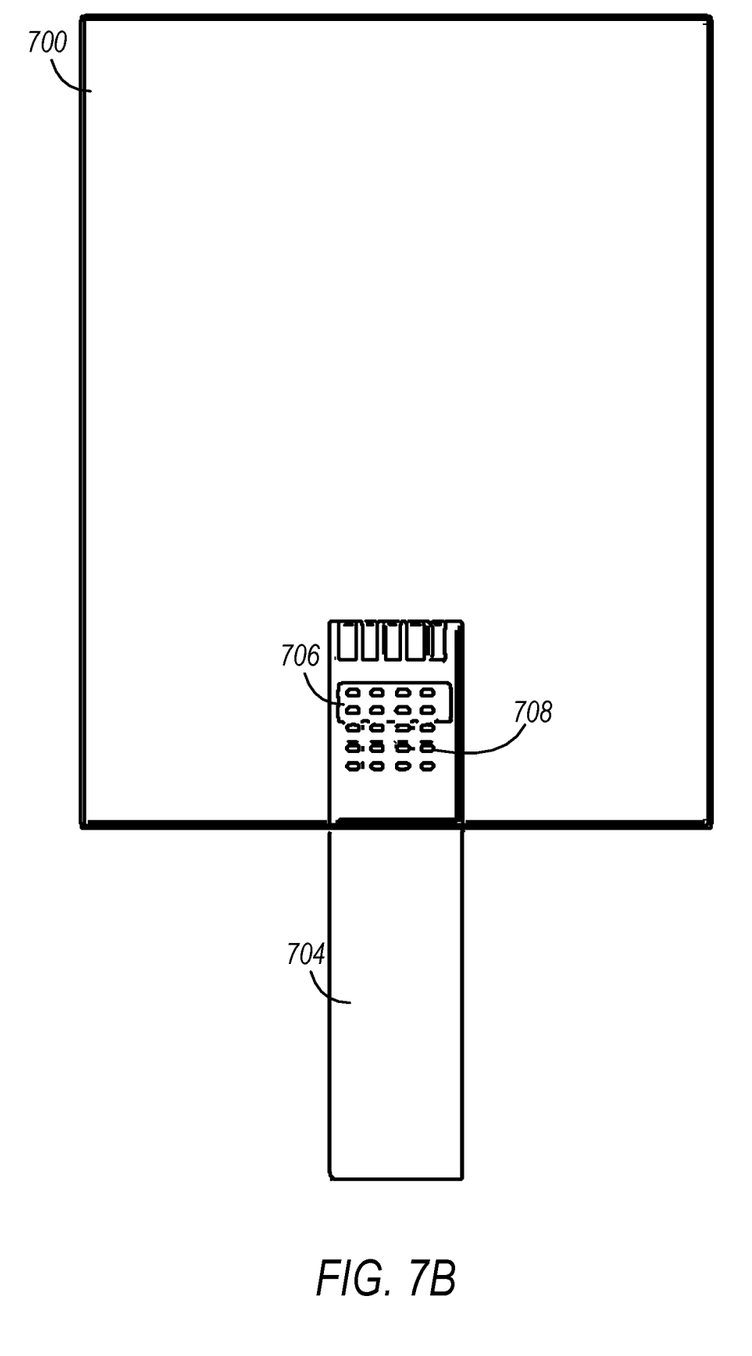
Figure 7C:
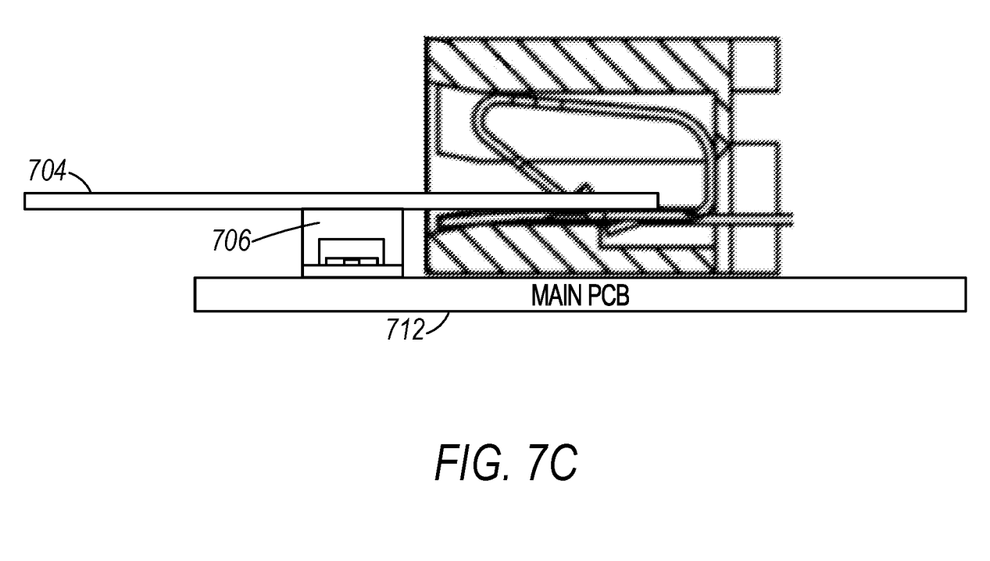

FIG. 7A shows an example of a user interface electronics unit 700, e.g., with a display 702, such as for reading a chemical assay from an assay strip 704 under test that can be inserted into the electronics unit 700. The assay strip 704 can also include a printed bar or other code 708 that can be read by a code reader 706 within the electronics unit 700 when the assay strip 704 is inserted into the electronics unit 700, such as shown in FIG. 7B. In an illustrative example, the code reader 706 can include a 3×3×1 millimeter package, such as can be constructed with a low bill of materials (e.g., less than $1 USD) and can accommodate a high density of code reading (e.g., >20 bits per millimeter per lane of printed data). For example, each lane can have a lane width of approximately 0.5 through 3 millimeters, such as can be selected based on mechanics of the assay strip 704. The code 708 can be printed by any printing process (e.g., the same low-cost printing process used to print any logo, etc.) and can still be read by the code reader 706, which can be very flexible in accommodating different types of strips, tolerances, etc. FIG. 7c shows an illustrative example of a position of the code reader 706 such as integrated within or located on the "outboard" side of a chemical assay strip reader 710 on a shared main Printed Circuit Board (PCB) 712 included in the electronics unit 700. In FIG. 7C, the code reader 706 can be compatible and used together with commercially available connectors and chemical assay strip readers 710. In this way, the code reader 706 can read the code on the strip 704 as it is being inserted past the code reader 706 and into the chemical assay strip reader 710.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A lensless system for optically reading an encoded pattern on a patterned test strip or other patterned target placed in proximity and moved with respect to an optical code reader without requiring use of a focusing lens and without requiring forming a multi-dimensional image of the encoded pattern, the system comprising:
   the optical code reader, comprising:
   an LED light source;
   a plurality of photodetectors including individual ones of the photodetectors arranged to separately lenslessly receive corresponding individual light signals from a target location and to respectively form corresponding individual response signals respectively based thereupon, individual ones of the response signals providing information about the encoded pattern at the target location;
   an opaque transmit baffle, located between the LED light source and the target and housing the LED light source therewithin, the transmit baffle defining a transmit aperture for lenslessly passing light originating from the LED light source to a target location on the patterned target;
   an opaque receive baffle, located between the photodetector and the target and housing the photodetector therewithin, the receive baffle defining a plurality of individual receive apertures, individually directed for corresponding to a particular individual photodetector of the plurality of photodetectors for individually lenslessly passing light directed toward only a corresponding one of the plurality of photodetectors; and
   signal processing circuitry, coupled to the individual ones of the photodetectors to receive the response signals, and to decode information about the encoded pattern without requiring forming a multi-dimensional image of the encoded pattern.

2. The system of claim 1, in which the LED light source and the plurality of photodetectors are located on opposite sides of the patterned target for optically reading the encoded information via light transmission through the patterned target without requiring use of focusing lens.

3. The system of claim 1, in which the LED light source and the plurality of photodetectors are located facing the same facing surface of the patterned target for optically reading the encoded information via light reflection or scattering from same facing surface of the patterned target.

4. The system of claim 1, comprising a guide for aligning and manually or automatically moving the patterned target with respect to the optical code reader.

5. The system of claim 1, in which at least one of the transmit aperture an individual one of the receive apertures defines a circular lateral cross-section for passing light.

6. The system of claim 1, in which at least one of the transmit aperture or an individual one of the receive apertures defines an oblong lateral cross-section for passing light.

7. The system of claim 1, in which a baffle thickness about at least one of the transmit aperture or the individual one of the receive apertures is thick enough to restrict light to a corresponding individual lane defining a specified sub-portion of a width of the patterned target.

8. The system of claim 1, comprising a diffractive optic located in association with at least one of the transmit aperture or at least one of the individual ones of the receive apertures.

9. The system of claim 1, wherein at least one of the transmit aperture or the individual one of the receive apertures is oriented at an angle that is oblique to a normal to a surface of the target.

10. The system of claim 1, wherein both of the transmit aperture and the individual one of the receive apertures are oriented at an angle that is oblique to a normal to a surface of the target for reading encoded information from the patterned target via at least one of reflection or scattering.

11. The system of claim 1, in which the optical reader includes a multi-zoned arrangement of one or more LED light sources or transmit apertures and individual ones of the photodetectors and corresponding receive apertures arranged for reading individual lanes of information across a first lateral dimension of the patterned target as the patterned target is moved in a direction of a second lateral dimension of the patterned target, wherein the second lateral dimension of the patterned target is perpendicular to the first lateral dimension of the target and perpendicular to a thickness of the patterned target.

12. The system of claim 1, in which the optical code reader is configured to read and decode multi-level information including different lengths of contrasting light and dark regions, the different lengths oriented in a direction perpendicular to movement of the patterned target and perpendicular to thickness of the patterned target.

13. The system of claim 1, in which at least one of the transmit baffle or the receive baffle defines at least one cavity, wherein the cavity includes a reflective surface within the cavity.

14. An article of manufacture, comprising a patterned target including an encoded pattern readable by a lensless optical code reader using an LED light source, without requiring use of a focusing lens and without requiring multidimensional imaging, the patterned target comprising:
an arrangement of optically contrasting regions in a sequence in a lateral dimension along a direction of movement of the patterned target with respect to the lensless optical code reader, wherein the patterned target includes an arrangement of multiple lanes of concurrently readable separate codes, readable lenslessly and without requiring multidimensional imaging, the codes comprising optically contrasting regions in a sequence in a lateral dimension along a direction of movement of the patterned target with respect to the lensless optical code reader.

15. The article of manufacture of claim 14, wherein the patterned target is configured to be read by lensless optical code reader comprising:
an LED light source;
an opaque transmit baffle, located between the LED light source and the target, the transmit baffle defining a transmit aperture for lenslessly passing light originating from the LED light source to a target location on the patterned target;
a plurality of photodetectors including individual ones of the photodetectors arranged to separately lenslessly receive corresponding individual light signals from the target location and to respectively form corresponding individual response signals respectively based thereupon, individual ones of the response signals providing information about the encoded pattern at the target location;
an opaque receive baffle, located between the photodetector and the target, the receive baffle defining a plurality of individual receive apertures, individually directed for corresponding to a particular individual photodetector of the plurality of photodetectors for individually lenslessly passing light toward only a corresponding one of the plurality of; and
signal processing circuitry, coupled to individual ones of the photodetectors to receive the response signals, and to decode information about the encoded pattern without requiring forming a multi-dimensional image of the encoded pattern.

16. The article of manufacture of claim 14, wherein the patterned target includes an arrangement of multiple lanes, lateral to a direction of movement of the patterned target, of optically transmissive optically contrasting regions.

17. The article of manufacture of claim 14, wherein the patterned target includes an arrangement of multiple lanes, lateral to a direction of movement of the patterned target, of optically reflective or scattering optically contrasting regions.

18. A method of optically reading an encoded pattern on a patterned test strip or other patterned target placed in proximity and moved with respect to lensless optical code reader without requiring use of a focusing lens and without requiring forming a multi-dimensional image of the encoded pattern, the method comprising:
lenslessly passing light originating from an LED light source housed within an opaque baffle to a target location on a patterned target via a transmit aperture in the opaque baffle of an optical code reader;
lenslessly receiving light from the target via an individual one of a plurality of receive apertures in a housing carrying a plurality of individually apertured photodetectors using the individual one of the plurality of receive apertures to separately guide light toward a corresponding individual one of the photodetectors within an opaque baffle having the receive aperture;
lenslessly detecting the received light using individual ones of the photodetectors to produce corresponding individual response signals a photodetector and producing a response signal providing information about the encoded pattern at the target location; and lenslessly decoding information about the encoded information using the individual ones of the response signals.

19. The method of claim 18, further comprising at least one of placing the patterned test strip or other patterned target placed in proximity with the code reader or moving the patterned test strip or other patterned target with respect to the lensless optical code reader.

20. The method of claim 18, in which the LED light source and the plurality of the photodetectors are located on opposite sides of the patterned target for lenslessly optically reading the encoded information via light transmission through the patterned target without requiring use of a focusing lens.

21. The method of claim 18, in which the LED light source and the plurality of the photodetectors are located facing the same facing surface of the patterned target for optically reading the encoded information via light reflection or scattering from same facing surface of the patterned target.

22. The method of claim 18, comprising aligning and manually or automatically moving the patterned target with respect to the lensless optical code reader.

23. The method of claim 18, comprising passing light via at least one of the transmit aperture or the individual one of the receive apertures defining a circular lateral cross-section for passing light.

24. The method of claim 18, comprising passing light via at least one of the transmit aperture or the individual one of the receive apertures defining an oblong lateral cross-section for passing light.

25. The method of claim 18, comprising using the transmit aperture for restricting light to a lane defining a specified sub-portion of a width of the patterned target.

26. The method of claim 18, comprising diffracting light passing through at least one of the transmit aperture or the at least one of the receive apertures.

27. The method of claim 18, comprising passing light through at least one of the transmit aperture or the at least one of the receive apertures being oriented at an angle that is oblique to a normal to a surface of the target.

28. The method of claim 18, comprising passing light through both of the transmit aperture and the at least one of the receive apertures being oriented at an angle that is oblique to a normal to a surface of the target for reading encoded information from the patterned target via at least one of reflection or scattering.

29. The method of claim 18, comprising reading individual lanes of information across a first lateral dimension of the patterned target as the patterned target is moved in a direction of a second lateral dimension of the patterned target, wherein the second lateral dimension of the patterned target is perpendicular to the first lateral dimension of the target and perpendicular to a thickness of the patterned target.

30. The method of claim 18, comprising reading and decoding multi-level information including different lengths of contrasting light and dark regions, the different lengths oriented in a direction perpendicular to movement of the patterned target and perpendicular to thickness of the patterned target.

31. The method of claim 18, comprising using at least one of a transmit baffle or a receive baffle that defines at least one cavity.

32. The method of claim 31, comprising reflecting light via a reflective surface included within the cavity.

* * * * *

UNITED STATES PATENT AND TRADEMARK OFFICE
CERTIFICATE OF CORRECTION

| | | |
|---|---|---|
| PATENT NO. | : 12,412,054 B2 | Page 1 of 1 |
| APPLICATION NO. | : 18/257498 | |
| DATED | : September 9, 2025 | |
| INVENTOR(S) | : Shrenik Deliwala | |

It is certified that error appears in the above-identified patent and that said Letters Patent is hereby corrected as shown below:

In the Claims

In Column 12, Line 33, in Claim 15, delete "of;" and insert --of photodetectors;-- therefor In Column 12-13, Line 67-1, in Claim 18, after "signals", delete "a photodetector and producing a response signal"

Signed and Sealed this
Fourth Day of November, 2025

John A. Squires
*Director of the United States Patent and Trademark Office*